United States Patent
Reiley et al.

(10) Patent No.: US 7,607,214 B2
(45) Date of Patent: Oct. 27, 2009

(54) METHOD OF MANUFACTURING A SILICON SLIDER BY AN ALKALINE ETCH

(75) Inventors: Timothy Clark Reiley, San Jose, CA (US); Barry Cushing Stipe, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 406 days.

(21) Appl. No.: 11/064,659

(22) Filed: Feb. 22, 2005

(65) Prior Publication Data

US 2006/0187585 A1      Aug. 24, 2006

(51) Int. Cl.
*G11B 5/127* (2006.01)
*B44C 1/22* (2006.01)

(52) U.S. Cl. .............. 29/603.12; 29/603.15; 29/603.16; 29/603.18; 360/234.3; 360/234.4; 360/235.4; 216/22

(58) Field of Classification Search .............. 29/603.07, 29/603.12, 603.15, 603.16, 603.17, 603.18, 29/603.19; 360/234.3, 234.4, 235.4; 117/89; 216/22, 40
See application file for complete search history.

(56) References Cited

U.S. PATENT DOCUMENTS

| | | | | |
|---|---|---|---|---|
| 4,418,472 A | * | 12/1983 | Lorenze, Jr. | ......... 29/603.15 X |
| 5,408,373 A | | 4/1995 | Bajorek et al. | .............. 360/104 |
| 5,587,857 A | * | 12/1996 | Voldman et al. | ...... 360/234.4 X |
| 5,894,389 A | | 4/1999 | Kanamine | ................... 360/126 |

(Continued)

FOREIGN PATENT DOCUMENTS

JP          05159237 A   *   6/1993
WO       WO03/049201       6/2003

OTHER PUBLICATIONS

H.Tanaka, S. Yamashita, Y. Abe, M. Shikida, K. Sato, "Fast Wet Anisotropic Etching of Si {100} and {110} With a Smooth Surface in Ultra-High Temperature KOH Solutions,", Transducers, Solid-State Sensors, Actuators and Microsystems, 12th International Conference on, p. 1675-8, vol. 2, Jun. 2003.

(Continued)

*Primary Examiner*—A. Dexter Tugbang
(74) *Attorney, Agent, or Firm*—Zilka-Kotab, PC (57) ABSTRACT

A slider for use in a magnetic data recording system that is constructed from a Si wafer by a method that saves valuable wafer real estate by minimizing kerf related to the cutting of the wafer into slider rows. The sliders are produced from a (110) oriented Si wafer, and the sliders are parsed into rows by a process that involves forming a mask having a trench or opening between the rows of sliders at the location of the desired cut and parallel to a vertical (111) plane of the wafer. The wafer is then exposed to KOH which removes wafer material in the vertical direction through the wafer without removing wafer material in the horizontal direction. The vertical removal of wafer material is due to the extreme preferential removal of the (110) surface Si over that of the (111) surface Si. This results in a narrow straight trench being formed. The KOH etch removal can form a trench or cut having a width of only 30 to 50 um through a 1 mm thick wafer.

11 Claims, 5 Drawing Sheets

U.S. PATENT DOCUMENTS

| | | |
|---|---|---|
| 6,296,777 B1 * | 10/2001 | Engelhardt et al. ............ 216/40 |
| 7,229,499 B2 * | 6/2007 | Ishida ......................... 117/89 |
| 2002/0145827 A1 | 10/2002 | Bunch et al. ............. 360/235.1 |
| 2004/0033763 A1 | 2/2004 | Bunch et al. .................. 451/29 |
| 2004/0114502 A1 | 6/2004 | Takahashi et al. ........... 369/300 |

OTHER PUBLICATIONS

A. Blakers, K. Weber, V. Everett, S. Deenapanray, J. Babaei and M. Stocks, "Silver Modules® -A Crystalline Silicon Technology of the Future," Center for Sustainable Energy Systems, ANU, Canberra, ACT 0200, Australia.

* cited by examiner

METHOD OF MANUFACTURING A SILICON SLIDER BY AN ALKALINE ETCH

FIELD OF THE INVENTION

The present invention relates to the fabrication of a slider for use in magnetic recording and more particularly to the use of an alkaline etch process to parse a wafer into rows of sliders.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk and when the disk rotates, air adjacent to the surface of the disk moves along with the disk. The slider flies on this moving air at a very low elevation (fly height) over the surface of the disk. This fly height is on the order of nanometers. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

A common write head configuration includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. This sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is biased parallel to the ABS, but is free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

Conventional magnetic recording head sliders are typically made from wafers of a two-phase ceramic, $TiC/Al_2O_3$, also called Al—TiC. After the thin film processing to prepare the recording heads is performed on the Al—TiC wafers, the sliders are then formed. The sliders are fabricated by cutting, grinding and lapping the wafer made of the above material. This involves a series of shaping and polishing operations, and also the formation of an air bearing, usually using dry etching.

More particularly, once the read sensor and write element are formed on the wafer (usually thousands of such sensors and write elements being formed on a single wafer) the wafer is sliced into rows. This has traditionally been performed by a saw. As can be appreciated, such saw blades can only be made so thin, and as a result a significant amount of the wafer is wasted as unused kerf region to accommodate the width of the saw cut between each row. Since the price margins for the production of magnetic sliders is very tight, manufactures must produce as many usable sliders as possible from each wafer. This slider yield is a function of both the number of sliders that can be fit onto a single wafer as well as the percentage of useable sliders that can pass inspection once manufacturing is complete. Therefore, since the sawing of wafers into rows consumes a large percentage of the wafer as unusable kerf region, such sawing reduces yield and increases the cost of a slider.

After the wafer has been parsed into individual rows, the air bearing surface is then lapped to remove sufficient material to allow the magnetic sensor to have a desired stripe height and to allow the write element to have the desired throat height. Various patterning and etching processes are then performed to configure the air bearing surface with a desired air bearing surface shape designed for optimal aerodynamic characteristics. This surface shape usually includes at least one pad located at a trailing edge of the slider and two or more pads and other shapes located closer to the leading edge of the slider. These distribute high pressure regions to desired locations on the air bearing surface in order to define a low, stable fly-height. The rows are then sliced into individual sliders by cutting in a direction perpendicular to the direction used to cut the wafers into rows.

As mentioned above, the wafer have substrates typically been constructed of TiC in an alumina matrix $Al_2O_3$. It turns out that Al—TiC is not the ideal material for use in a slider. Al—TiC is an extremely hard material and can be prone to causing media damage during head disk contact. A softer material with high thermal conductivity, such as Si has been found to provide better characteristics for use as a slider body and causes less damage to the media during a head disk contact.

Although not the ideal material for use as a slider body, the use of this very hard, tough Al—TiC material has been necessitated partially by the use of the above described sawing of the wafer into rows. The sawing operation used to cut the wafer into rows creates very high stresses on the wafer material. If this sawing operation is used on a comparatively less tough material such as Si, the stress on the wafer material during the sawing operation causes chipping and cracking in the rows. Some of these cracks may be propagated at some later point, including during operation in the disk drive. Also, chipping or cracking at the ABS results in an unacceptable change in flying characteristics, thereby making diamond saw cutting an undesirable process for making Si rows.

U.S Patent Publication US2002/0145827 A1, published on Oct. 10, 2002 by Bunch et al. teaches a method for manufacturing sliders from a silicon wafer using a deep reactive ion etching (DRIE) technique. The DRIE technique used results in a cut that is wider at the bottom of the cut than at the top of the cut. The wedge angle can cause some problems with handling the sliders and with lapping and other manufacturing steps. The use of DRIE also requires the use of expensive tooling since each DRIE tool costs up to one million dollars and has very low wafer throughput.

There is therefore, a strong felt need for a manufacturing method that can be used to parse a wafer into rows without the resulting stress induced fracturing exhibited by the prior art sawing practice. There is also a strong felt need for a method for parsing a wafer into rows with minimal material loss of wafer real estate (ie. with a minimal cut thickness). Preferably such method would allow the use of a wafer constructed of a material such as Si rather than TiC, since Si sliders have the potential for improved slider performance and economics.

SUMMARY OF THE INVENTION

The present invention provides an economic method for constructing a slider from a Si wafer that significantly reduces wafer material waste during the parsing of the wafer into slider rows. According to the present invention, a plurality of read/write heads are patterned in a plurality of rows onto a Si wafer. A mask is formed over the wafer, the mask having an opening or trench formed between the rows of sliders. The wafer is then exposed to an etchant such as which removes wafer material to form a trench straight down into the wafer.

The wafer used is a single crystal Si wafer. Such wafers have a diamond structure with a (110) crystal orientation at the surface. This structure is the same as a face centered cubic (fcc) structure with a two atom basis. The (110) silicon wafer therefore has a pair of (111) planes oriented perpendicular to the surface of the wafer and at an angle of 70.5 degrees with respect to one another. Rows of heads are constructed on the wafer to be aligned with one of these (111) planes.

Preferably a reactive ion etch (RIE) mask such as Ni or other transition metal is used to RIE through the deposited material between rows. Then a KOH mask such as SiN is formed thereover to define a trench aligned with one of the vertical (111) planes of the silicon wafer. The trench or opening in the mask can be very narrow, defining a trench in the wafer having a width less than 15 um to 30 um.

The KOH or other etchant advantageously attacks all of the crystal planes very rapidly except the (111) planes, leaving any etched surface covered with (111) planes. Since there is a (110) plane parallel with the surface of the wafer, and the (111) planes are perpendicular to the surface of the wafer, the KOH etching forms deep narrow trenches into the wafer with very smooth vertical side walls.

By using the KOH etching method of the present invention, rows can be formed with a very small kerf loss of only 30 to 50 um after etching through a 1 mm thick silicon wafer. The present cutting process of the present invention can have a very high throughput and very low capital equipment cost compared to DRIE.

These and other advantages and features of the present invention will be apparent upon reading the following detailed description in conjunction with the Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
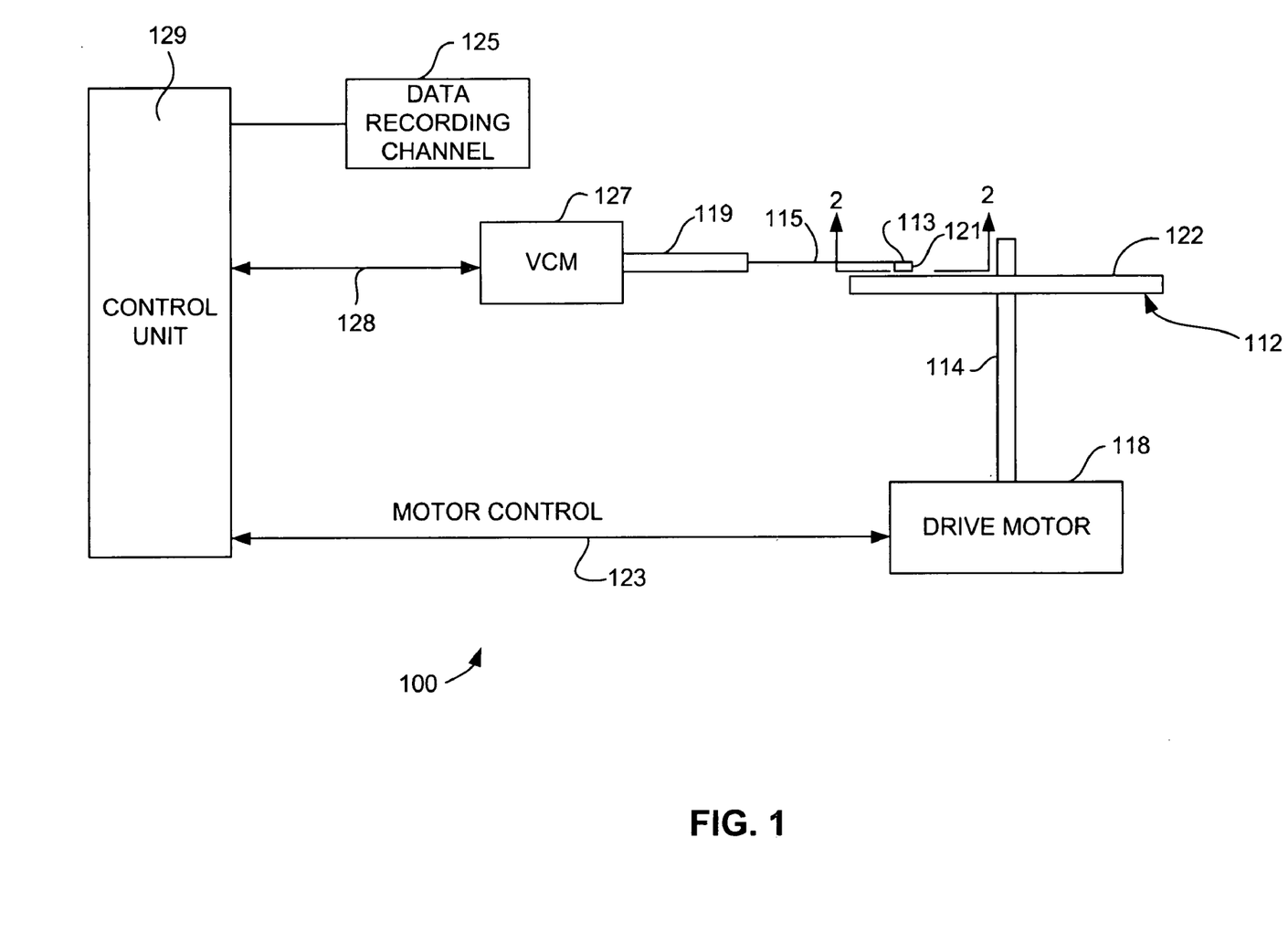
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
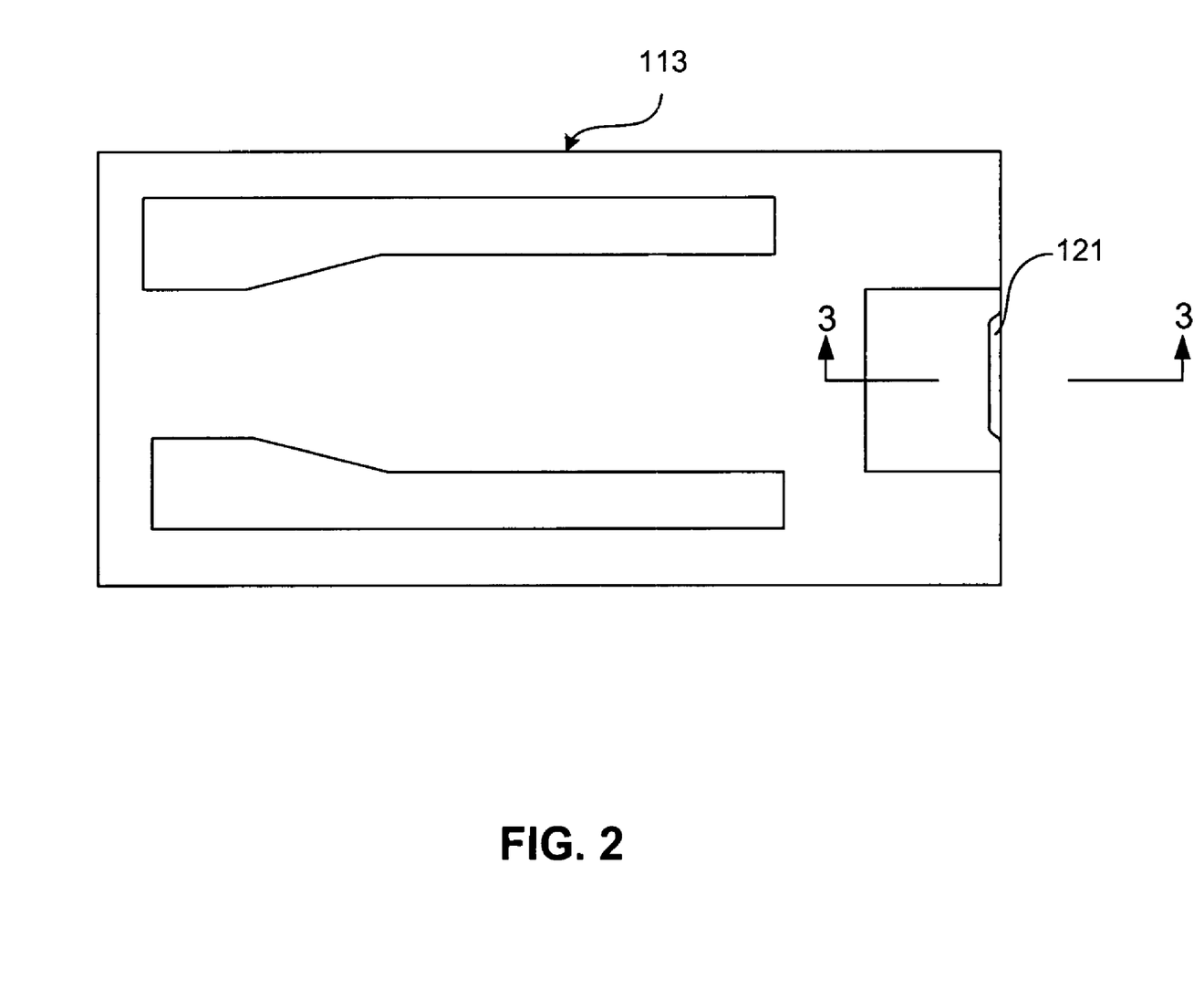
FIG. 2 is an ABS view of a slider, taken from line 3-3 of FIG. 2, illustrating the location of a magnetic head thereon.
Figure 3:
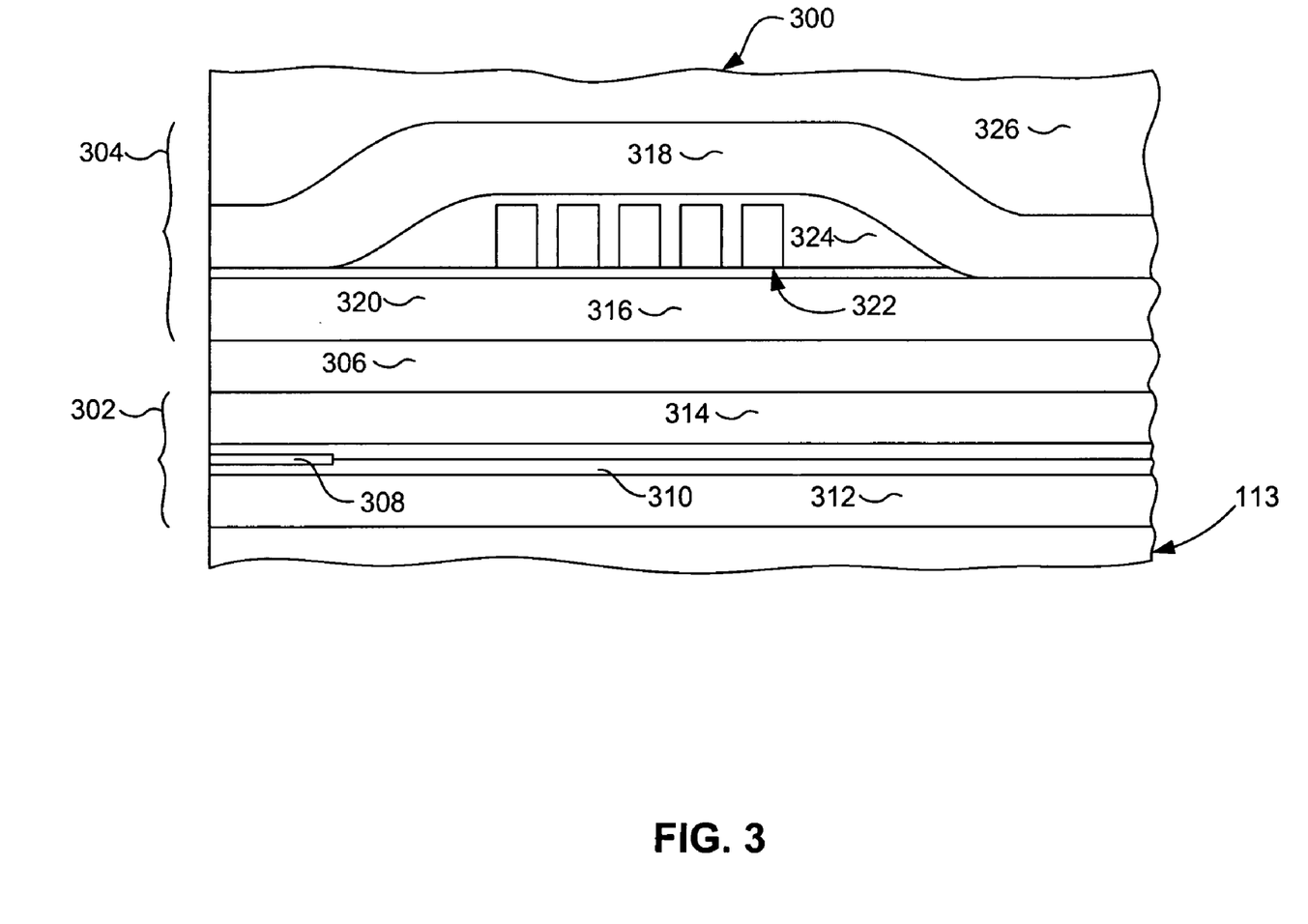
FIG. 3 is a cross sectional view of a read/write head according to an embodiment of the present invention taken from line 3-3 of FIG. 2 and rotated 90 counterclockwise.

With reference to FIG. 2, the orientation of the magnetic head 121 in a slider 113 can be seen in more detail. FIG. 3 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

With reference now to FIG. 3, a read/write head 300 that includes read head 302 and a write head 304 is formed on the trailing end of the slider 113. The read and write heads 302, 304 may be separated by a layer of non-magnetic dielectric material 306 as shown in FIG. 3 or may be constructed as a merged head design in which a shield of the read head 302 serves as a pole of the write head 304. The read head 302 includes a magnetoresistive sensor 308, which is embedded within a non-magnetic, dielectric material 310 such as alumina. First and second magnetic shields 312, 314, constructed of a magnetic material such as NiFe are formed above and below the sensor 308 and dielectric layer 310.

The write head includes first and second magnetic poles 316, 318, which are separated from one another by a write gap 320 in a pole tip region near the ABS and are magnetically connected to one another at the back gap region. An electrically conductive coil 322 passes between the first and second poles 316, 318, and is electrically insulated from the poles 316, 318 by an insulation layer 324, and by the write gap layer 322. When a write a write current flows through the coil 322, a magnetic flux is induced in the poles 316, 318, inducing a fringing field at the ABS between first and second poles 316, 318. This fringing field writes a magnetic bit on a magnetic medium passing nearby the ABS. A layer of insulation 326 may cover the read and write heads 302, 304. It should be pointed out that the above described read and write heads 302, 304 are by way of example only, and any type of read/write head can be incorporated into the present invention. For example, the read sensor 308 used in the read head 302 could be a giant magnetoresistive sensor (GMR), a tunneling magnetoresistive sensor (TMR) or some other type of sensor. Similarly, the write head 304 could have any type of write head structure such as one having one or more pedestal portions in the pole tip region or having more than one coil passing between the coils.

Figure 4:
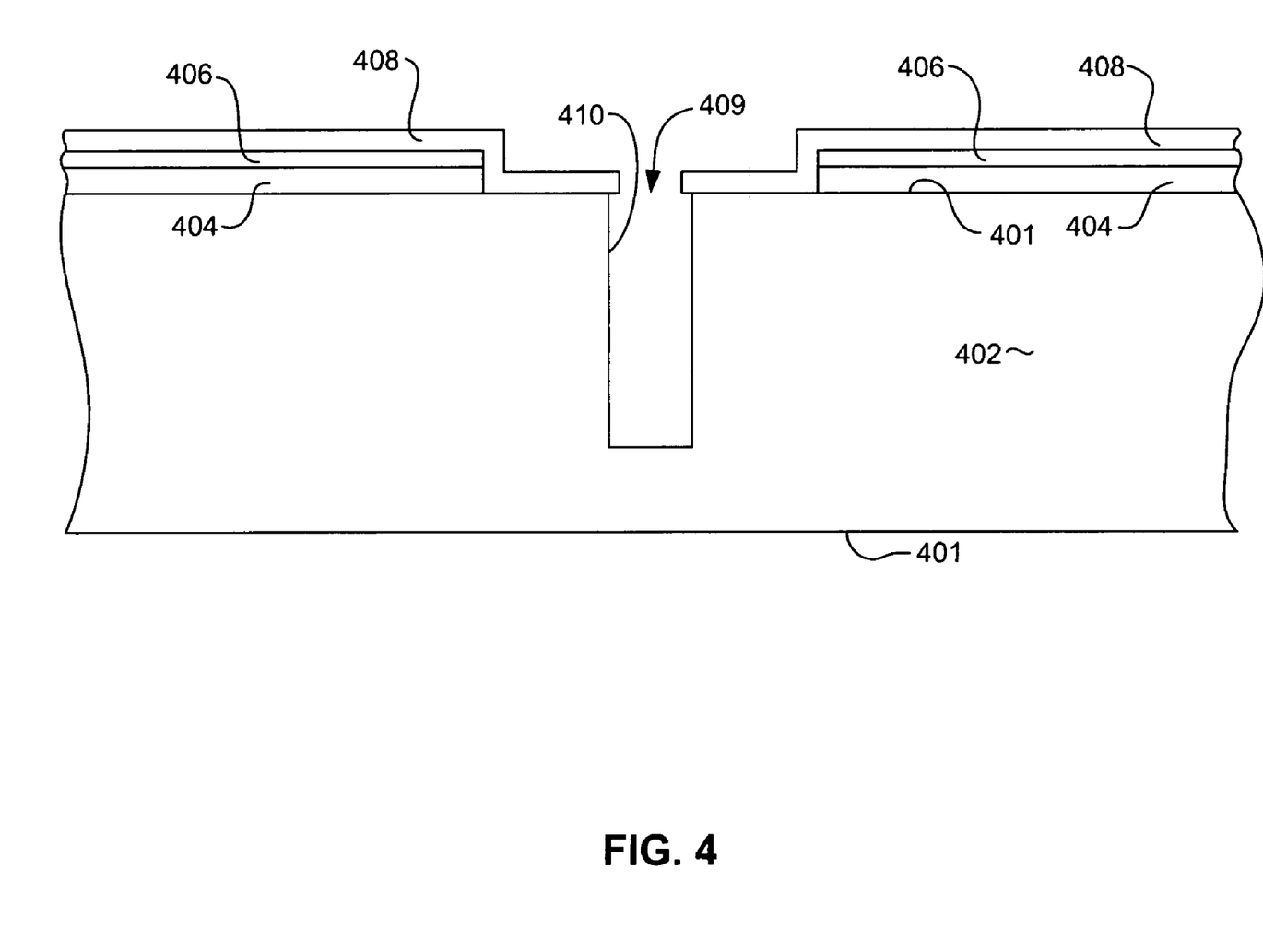
FIG. 4 is cross sectional view of a wafer from which a plurality of sliders can be manufactured according to the present invention.
Figure 5:
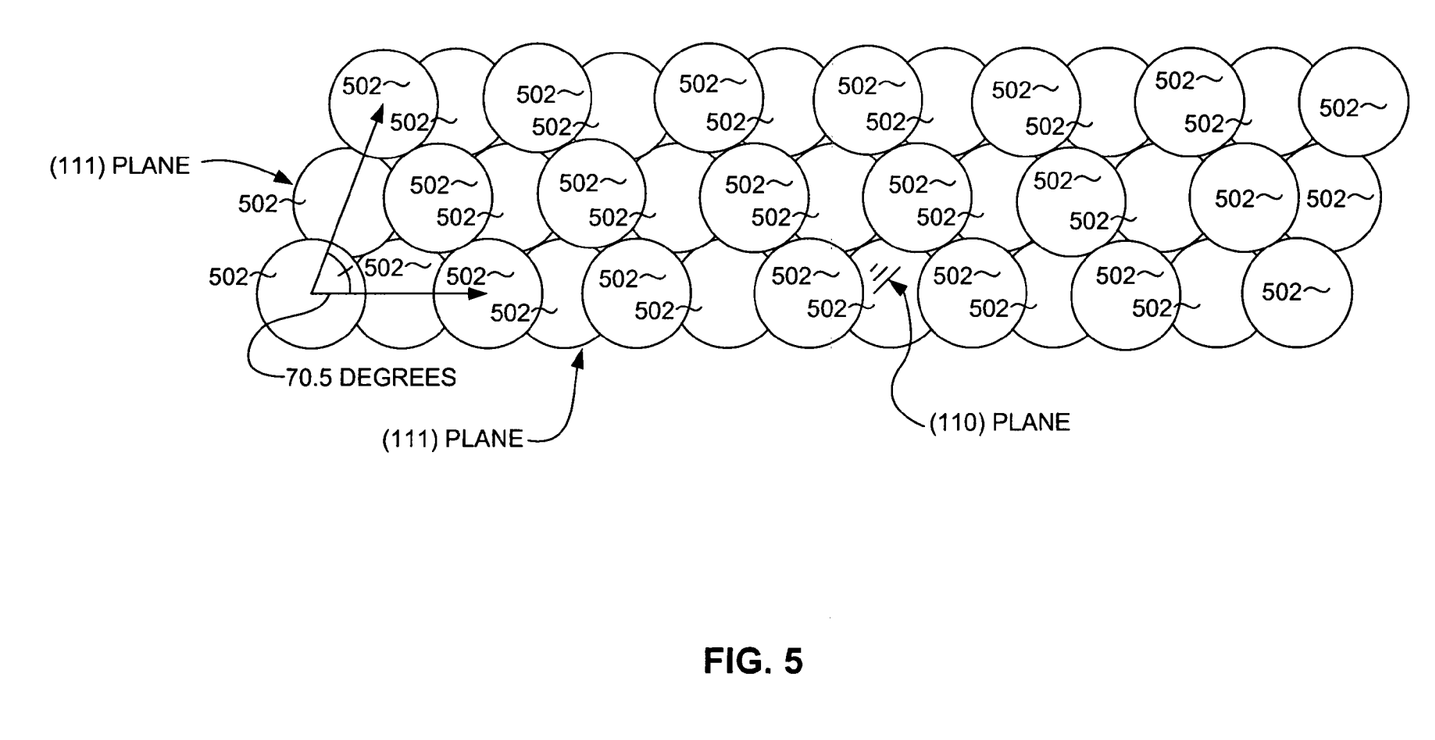
FIG. 5 is a top down view of a wafer at an atomic level showing a crystalline structure of the wafer from which a plurality of sliders can be manufactured according to an embodiment of the present invention.

With reference now to FIG. 4, a method is described for parsing a silicon wafer into rows of sliders. FIG. 4 shows a cross sectional view of a portion of a wafer 400. The wafer 400 is constructed of single crystal silicon, which can be more readily understood with reference to FIG. 5 which illustrates the atomic structure of the wafer as viewed from the top surface of the wafer 400. Silicon has the diamond structure which is the same an fcc structure with a two atom basis. Each sphere 502 in FIG. 5 represents a pair of Si atoms. The wafer has two vertical two (111) planes which are at 70.5 degrees with respect to one another and has a (110) plane that is perpendicular to the two (111) planes. The top and bottom surfaces 401 of the wafer 400 are along the (110) plane.

With reference again to FIG. 4, the wafer 402 has a plurality of read/write head structures 404 (read head 302 and write head 304) formed on its surface. The read/write head structures 404 are arranged to define rows, which rows extend into and out of the plane of the page in FIG. 4. In other words the two read/write head structures 404 shown in FIG. 4 are in different, adjacent rows. The rows are aligned parallel with a vertical (111) plane of the silicon wafer. A RIE mask 406 is formed over the wafer 402 and head structure 404. The RIE mask 406 is formed of a material that is resistant to removal by reactive ion etching (RIE). Such a material could be for example Ni or some other transition metal. RIE is then used to remove deposited head materials (such as $SiO_2$ or alumina) between the rows. A chemical etch mask or KOH mask 408 is formed over the RIE mask and can be a material such as $Si_3N_4$. A photoresist, necessarily capable of being used at thicknesses of 30 to 50 um, covers the wafer and KOH mask 408. It is then patterned to expose part of the space between the rows 409. This allows the KOH mask to be etched away between the rows of head structures 404. The RIE mask 406 may be kept in place to cover and protect the read write head 404. The chemical etch mask (KOH mask) 408 defines an opening 409 at a desired location between the rows of head structures 404 and etching creates a trench 410 aligned with the (111) planes of the wafer. Note that according to the present invention, the opening can advantageously be very small. The opening can be less than 30 um, and more preferably can be 5 to 15 um.

With the RIE mask 406 and KOH mask 408 formed, the backside of the wafer is protected either with SiN or by attaching to a protective substrate. As mentioned above, the (110) Si wafer has two (111) planes perpendicular to the wafer surface. The wafer is then exposed to an anisotropic etchant, which can be a hot KOH bath or some other suitable etchant. For purposes of clarity, the bath will be described as a KOH bath. The KOH bath attacks all of the crystal planes except the (111) planes very rapidly, leaving any etched surface covered in (111) planes. Very deep, narrow slots may be formed in the wafer. This allows the wafer to be cut into rows without the need for deep reactive ion etching (DRIE) and without the need for sawing.

The KOH bath can form an extremely narrow trench after etching, the trench as shown being 30 to 50 um wide. The KOH bath also forms an extremely smooth planar surface across the cut surface. In fact, the surface of the cut is smooth to an atomic level, since the KOH bath cuts down directly through the crystal structure. Also, the KOH bath advantageously forms a very straight cut of constant thickness through the wafer. This allows rectangular sliders to be formed with very minimal kerf loss.

The KOH etch just described parses the wafer into rows that, when cut into individual sliders 113, results in sliders having the shape of a rectangular prism. Each slider 113 has an ABS surface and a top surface that is parallel to the ABS surface. The rectangular prism shaped slider also has a leading edge surface and a trailing edge surface that is parallel to and opposite the leading edge surface, as well as opposite, parallel side surfaces. The slider preferably has surfaces that meet at right angles rather than having a trapezoidal or other non-rectangular shape. The slider 113 has (111) crystalline planes at the ABS and opposite the ABS at the top surface, and has 110 planes at its leading and trailing end surfaces.

The smooth cut surface at the ABS creates an ideal surface on which to form a desired air bearing surface (ABS) topography. An ABS topography generally has surface features such as pads and possibly rails which affect the aerodynamic properties of the slider to maintain a desired low, stable fly height over a magnetic disk. In prior art processes, significant lapping was required to form a sufficiently smooth surface on which to form the ABS. Since the cutting procedure of the present invention provides a smooth surface, such lapping can be reduced. Furthermore, saw damage on the non-ABS side must be removed from conventional Al—TiC rows using backside lapping; this is not needed for KOH-etched Si rows.

This slider fabrication process can have a kerf as small as 30 to 50 um which is comparable to or better than DRIE without a resulting wedge angle and without expensive DRIE tools. A simple alkaline etch is also much more economical than sawing because the kerf is smaller and the throughput is much higher, allowing many more sliders to be fit onto a wafer. Also, the present invention allows the sliders to be constructed from a Si wafer while eliminating problems of chipping or cracking associated with prior art sawing techniques. After etching, the rows may be lapped before they are assembled on carriers with the ABS surface oriented upward for ABS patterning. Alignment error between the alkaline etch mask and the (111) planes can cause a scalloped surface on the sides, including the ABS. However, experiments show the step heights for the scallops are typically much less than a micron, and this can easily be removed during lapping.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing sliders for magnetic recording, the method comprising:
   providing a Si wafer oriented such that at least one (111) plane is perpendicular to a surface of the wafer;
   forming a plurality of read/write heads on the wafer, the read/write heads being arranged in a pattern defining at least two rows on the wafer and the rows being aligned parallel to a vertical (111) plane of the Si wafer, the formation of the read/write head further comprising, depositing read/write head materials and forming a RIE mask over the read write materials, the RIE mask being configured with a first shape to define at least one edge of the read write head, then performing reactive ion etching (RIE) to define the at least one edge of the read/write head;
   forming a KOH etch mask on the wafer, the KOH etch mask being configured with a second shape that is configured to define an opening between at least two rows of sliders; and
   exposing the wafer to an anisotropic etchant for Si.

2. A method as in claim 1, wherein the forming the KOH etch mask on the wafer, comprises:
   depositing a KOH etch resistant material;
   depositing a layer of photoresist over the KOH etch resistant material;
   patterning the layer of photoresist.

3. A method as in claim 1, wherein the
   the RIE mask comprises a transition metal or alloy including the transition metal; and
   the KOH etch mask comprises $Si_3N_4$ over the RIE mask.

4. A method as in claim 1, wherein:
   the RIE mask comprises Ni; and
   the KOH etch mask comprises $Si_3N_4$ a portion of which is formed over the RIE mask.

5. A method as in claim 1, wherein the anisotropic etchant is KOH.

6. A method as in claim 1, wherein the opening in the KOH etch mask has a width less than 30 um.

7. A method as in claim 1, wherein the anisotropic etchant forms a trench having a width of 30 to 50 um.

8. A method as in claim 1, wherein the wafer has a crystalline structure with a (110) plane parallel with the surface of the wafer, and a (111) plane perpendicular with the surface of the wafer.

9. A method as in claim 1 further comprising cutting the rows into a plurality of sliders, the sliders having a rectangular prism shape.

10. A method as in claim 1 further comprising cutting the rows in to a plurality of sliders, each slider having an air bearing surface (ABS) with a (111) crystalline plane at the ABS.

11. A method as in claim 1, wherein the exposing the wafer to the anisotropic etchant comprises exposing the wafer to a hot KOH bath.

* * * * *